United States Patent Office 3,158,727
Patented Nov. 24, 1964

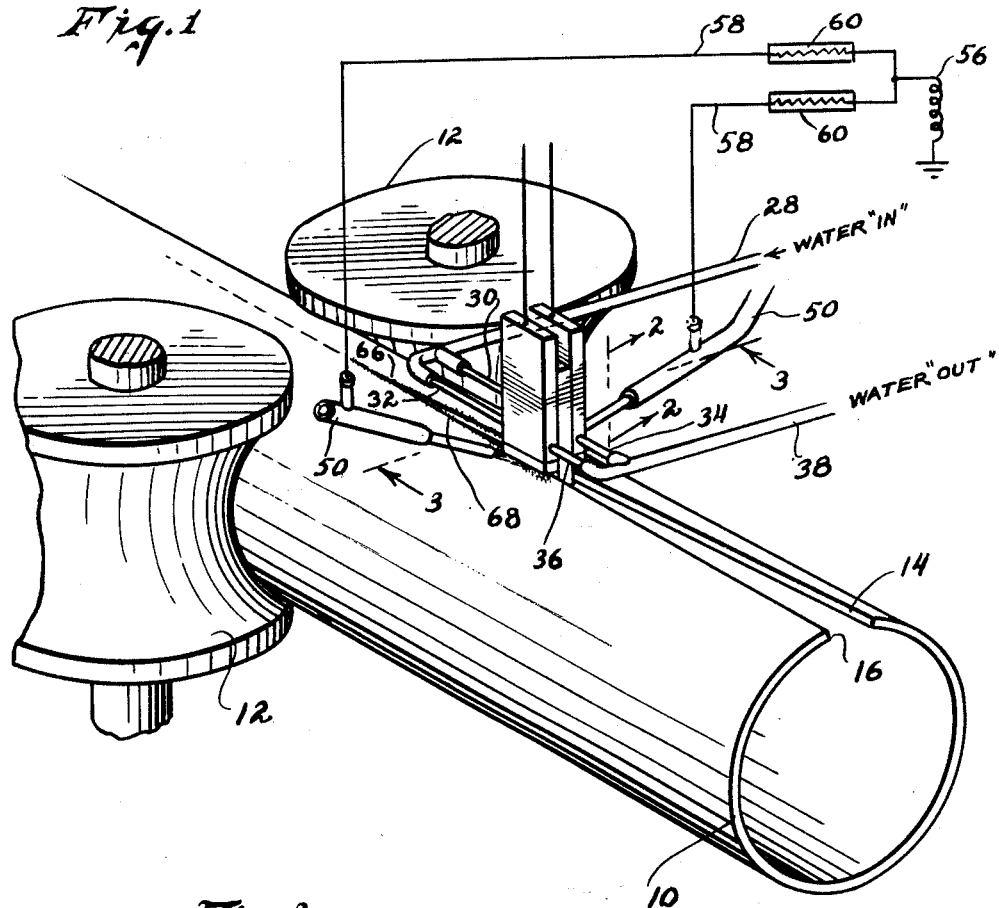
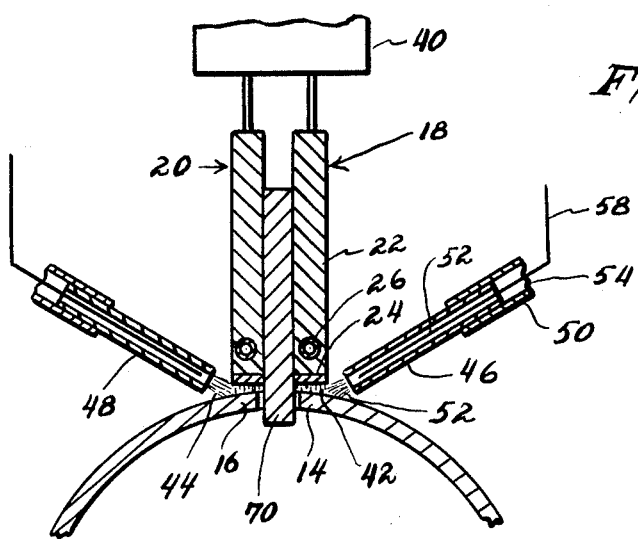

1

3,158,727
WELDING USING A PLASMA ARC
Augustin L. Woelz, Rua Texas 309, Sao Paulo, Brazil
Filed July 3, 1962, Ser. No. 207,290
10 Claims. (Cl. 219—60)

This invention relates to continuous welding of abutting edges of metal sheet in a seam and, more particularly, relates to an improved method and apparatus for welding a continuous longitudinal seam in metal tubing.

Continuous formation of pipe by forming or folding metal sheet stock into tubular configuration and welding the edges along a longitudinal seam as the edges are urged into abutting engagement, has been known for many years. Heating of the edges by flow of electric current has been found advantageous.

Restriction of the penetration depth of the electric current by using high frequency current has been taught by Bennett, Patent 2,066,668. The skin effect of high frequency currents concentrates the current at the edge skin, thus concentrating the heating effect at the edges to be joined in a weld.

Bennett's teachings have been used in continuous welding of formed pipe by applying high frequency current to the edges of sheet stock through sliding contacts positioned before the position of abutting of the edges, as for example in Park U.S. 2,794,108.

However, the sliding contacts must be fabricated of material which will resist the high abrasion forces of the moving pipe. Unfortunately, the requirements for abrasion resistance are usually incompatible with the desired electrical properties of the contacts. Thus, for example, material having the low resistivity desired for optimum electrical efficiencies is discarded for other materials of less desirable electrical characteristics, but which have the desired mechanical characteristics.

Maintenance of circuit continuity through the contacts has led to the requirement that the edges be mechanically scraped and cleaned, and that the mechanisms for folding the sheet into tubular form be quite precise.

For example, arcing between the contacts caused by dirt or by warpage or uneveness of the edge usually requires interruption of the generator output until proper circuit conditions are reestablished. The positioning requirements alone have led to relatively complex and expensive arrangements to position the tube edges with the desired precision. Such arrangements have the drawback of reducing the flexibility of the manufacturing equipment. For example, when the pipe size is changed, the positioning equipment and contacts must be changed.

Also, when forming pipe of relatively heavy wall it becomes difficult to provide the desired heat distribution in the edges. For example, the tendency of the current to concentrate in the upper corner has led to the proposal of applying contacts internally of the pipe. Also, to heat the edges of thick material, it has often been found necessary to provide auxiliary heating equipment to heat the edges in depth to prevent excessive cooling of the edges.

It is, therefore, an object of this invention to provide an improved method and apparatus for producing tubing from folded sheet material welded along an axially-extending seam.

It is a further object of this invention to provide an improved method and apparatus for welding together the edges of continuously moving sheet material in which a source of high frequency current is coupled to the edges through a plasma arc.

In accordance with these objects, there is provided, in a preferred embodiment of this invention, a pipe manufacturing apparatus which includes means for folding a continuous sheet into a pipe having abutting edges. A set of pressure rollers are provided to bring the edges into abutting contact for welding. A welding station is provided before the pipe reaches the final forming rollers.

The welding station comprises a first and second electrode separated by a ceramic spacer, which spacer extends between the edges of the sheet being formed into pipe. The electrodes are positioned above the surfaces of the edges of the sheet and are separated therefrom.

Means are provided to establish a plasma arc between each electrode and the edge of the sheet above which it is mounted. High frequency electrical energy is applied across the electrodes. The plasma arc electrically couples the electrodes to the edges of the sheets, and the arc will carry the high frequency current from the electrode to the edge of the sheet. The electrical energy travels along the edges of the sheet to the position where the pressure rollers cause abutment of the edges. The current is sufficiently high to heat the edges so that the edges will join in welded engagement at the position of contact in a continuous longitudinal seam.

Means are provided for introducing a reducing or inert atmosphere when required. In this manner, there is provided a coupling arrangement in which variations in distance between the electrodes and the edges of the tubular material will have an insignificant effect on the energy transfer. The edges need not be prepared as precisely as with the arrangements of the prior art since burrs and other surface irregularities will not interrupt energy transfer. The flexibility of the arc enables a single set of contacts to be used for different sizes of pipe.

Having briefly described the present invention, it will be described in greater detail in the following portions of the specification which may best be understood by reference to the accompanying drawings, of which:

FIG. 1 is a perspective view of pipe welding apparatus constructed in accordance with the present invention;

FIG. 2 is a cross sectional view taken along lines 2—2 of FIG. 1; and

FIG. 3 is a cross sectional view taken along lines 3—3 of FIG. 1.

In the figures, there is shown a pipe welding apparatus in which a continuous sheet 10 of material is folded to form a pipe. The preliminary forming rollers are conventional and are, thus, not illustrated since they form no portion of the present invention.

The pressure or final forming rollers 12 are provided to bring the edges 14 and 16 of the sheet 10 into abutting engagement thereby to form the periphery of the pipe.

Ahead of the final forming rollers, looking in the direction of pipe travel, is a welding station consisting of electrodes 18 and 20. The electrodes are formed of high conductive copper portion 22 with a tungsten or other convenient metal face plate 24 affixed thereto in conventional manner. The conductors are preferably water cooled through ports 26 running through the electrodes which are supplied with water through a central water intake 28 which is branded into pipes 30 and 32. The water is exhausted through a central pipe 38 from branches 34 and 36. The positioning of the pipe in the illustration, which is partially schematic, is for convenience and clarity of illustration. The electrodes may be of conventional hollow construction to carry the water flow therethrough from shielded intake and outlet orifices into the generator.

The electrodes 18 and 20 are mounted above the surface of the edges 14 and 16, respectively, by a relatively short distance. The separation distance should, however, be sufficiently long so as to maintain the separation between the electrode and the corresponding surface despite variation in the surface position of the pipe, due to manufacturing variations in the folding operation. For example, it has been found that a $\frac{1}{16}$ in. separation is adequate in practice. The electrodes 18 and 20 are coupled to the output terminals of a high frequency generator 40 which generates a relatively low voltage, high current output at frequencies in the range of 200,000–500,000 c.p.s. The exact frequencies employed will be determined by the desired welding conditions in the application intended and may at times be higher or lower than the preferred range. The limitations are determined by the skin effect at the frequency used and the desired limitation of penetration of welding current into the edge of the material.

To transfer electrical energy from the respective electrodes to the edges of the pipe, plasma arcs 42 and 44 are established between the respective electrodes 18 and 20 and surfaces 14 and 16. The plasma is an ionized gaseous medium which may comprise molecules of the gas medium employed. The plasma is, as is known, conductive and couples the electrodes to the respective edges of the tubular section. The plasma may be established in conventional manner, as for example by directing a hydrogen gas stream or a stream of inert gas through ceramic tubes 46 and 48, at the gap between electrode and pipe edge. Each tube is provided with a hose 50 through which the inert gas may be introduced. An electrode 52 is centrally positioned within the tube by an annular insulator 54 and is coupled to a high voltage oscillating source, such as a Tesla coil 56 through insulated conductors 58 and resistors 60.

The output of the Tesla coil, or equivalent high frequency, high voltage source, is applied to the electrode 52, which is preferably a tungsten wire electrode, to generate an igniting arc 62 ionizing the gas passing through tube 46, 48. The ionized gas, or plasma is blown into the space between the electrode and the pipe edges. The arc so established is of high intensity and will, thus, provide a conductive path coupling the electrical energy from the water cooled electrodes to the surface of the pipe. The high intensity high frequency current coupled through the arc will, of course, assist in maintaining the plasma in ionized condition. The electrical energy so transmitted will travel down the V of edge 14 as illustrated by the shading 66 to the position of abutment between edges 14 and 15 and return along edge 16 as indicated by shading 68 to the other electrode. The high frequency of the applied energy will, through well known skin effect, cause a crowding or restriction of the current to the thin layer at the edge thereby to heat the edge alone. For additional detail of the welding of edges of abutting material conductively coupled at one end, see U.S. Patent 2,066,668. When the edges are driven into the abutting relationship, a weld will be produced therebetween.

A ceramic spacer is provided between the two electrodes, which spacer extends down between the edges 14 and 16 of the pipe to prevent the establishment of a plasma arc directly between the electrodes. This spacer may be conveniently formed of such material as beryllium oxide or a similar refractory ceramic. The spacer may also be used to mechanically maintain separation of the edges.

For example, the following typical specific values may be used: a spacing of 1/16-in. between electrodes and edges; a 30 kw. generator operating at a frequency of 300,000 c.p.s.; pipe speed of 50 ft./min.; pipe steel, 2″ diameter, 0.052-in. wall.

With such arrangement, the energy is transferred through the plasma arc. Since there is no direct contact of the surface of the material being welded, no contact wear exists. It must be noted that the plasma arc is utilized as an energy transfer media. The voltage applied to the contacts is not intended to, and will not generate arc intensities sufficient to directly heat the material to welding temperatures by ionic bombardment. Ionic bombardment of the electrode and the moving surfaces of the pipe does, of course, exist due to the voltage drop through the arc. However, the heat generated in the electrode surfaces by such bombardment is easily removed by internal water cooling. Heating of the surfaces by ionic bombardment is, of course, helpful. The preheating of the edges by ionic bombardment, particularly with thick wall pipe, prevents undesirable cooling of edges as the skin is heated by high frequency current.

However, since the contacts do not touch the surface of the moving pipe, there is not contact wear through abrasion. Thus, the contacts may be of material directly compatible with the desired arc characteristics and compromises need not be made to provide wear resistance. The surface conditions of the two edges become relatively unimportant since the arc is self-adjusting, maintaining the desired coupling without degradation or interruption by the surface conditions, such as burrs and the like. This feature permits manufacture of pipe at desired production rates without the need for carefully cleaning the edge and without production interruption caused by burrs or warping of the edge.

Since the plasma arc is self-aligning in that it will seek the shortest path to the material surface, a single electrode arrangement will be suitable for use with a plurality of pipe sizes. Thus, when the pipe diameters are changed in manufacture, changes of electrodes are not necessary to conform to the radii of the pipe.

In addition to the introduction of inert or reducing atmosphere through the pipes 50, such atmosphere may be introduced through the electrodes. The introduction of a reducing atmosphere through additional piping as for example in the electrodes, provides protection against oxidation of the pipe material when necessary. Since the plasma arc is conductive by virtue of ionized molecules, the addition of gas molecules does not eliminate the electrical coupling provided thereby. Thus, unlike the situation with sliding contacts, complete blanketing of the edges may be afforded with the present arrangement.

Similarly, variations in the positioning of the surface with respect to the electrodes can be tolerated with the arrangements set forth, as the plasma arc properly couples the electrical energy despite changes in distance between electrode and surface. In present manufacture, surface variations or defects are intolerable and often will require shut down of the assembly to reestablish a correct contact condition.

Further, the electrodes according to the present invention may be shaped to provide the desired plasma arc configuration. For example, with heavy wall tubing, the use of contacts on the outer surface results in a concentration of heating at the outer corner of the edges. With the present invention, the arc couples to the entire edge surface, giving the desired current conditions without the relatively difficult arrangement of providing sliding contact on the inside surface of the tube. The electrodes may be shaped to augment such coupling and, since the electrodes are not subject to mechanical wear, the configuration selected will be maintained over extended production runs.

Finally, the edges need not be cleaned or otherwise prepared, except as is necessary for the metallurgical conditions desired in the resultant weld. Thus, the expense of preparing the edges in accordance with the requirements of the sliding contact used by the art is eliminated.

This invention may be variously embodied and modified within the scope of the subjoined claims.

What is claimed is:

1. The method of welding a seam extending along opposed edges of two elongated metal portions which comprises advancing said portions while their edges pass along the line of the desired seam and past a weld point, firmly urging said edges together as they reach the region of the weld point, establishing a plasma arc in contact with said metal portions at a distance substantially in advance of said weld point and coupling high frequency energy to said metal portions through said plasma arc to establish a current flow along the edges of said metal portions to heat said edges to substantial depth and to melt said edges to weld said edges together at said region of welding, the frequency of said electric energy being sufficiently high to restrict current flow substantially to the edges of said metal portions.

2. Apparatus for welding the seam extending along opposed edges of two elongated metal portions which comprises means for advancing said portions with their edges passing along the line of the desired seam and past a weld point, said means including opposed rollers between which said metal portions are advanced and which urges said edges firmly together at least as said edges reach the region of said weld point, a first and second electrode positioned substantially in advance of said weld point, each of said electrodes being mounted adjacent a respective edge of said elongated metal portion and separated therefrom by a predetermined gap, a source of high frequency electrical energy coupled across said first and second electrode and means for establishing a plasma arc between each of said electrodes and its respective edge to provide a low impedance conductive path between the respective electrode and the edge of the metal portion to couple the high frequency energy from the power source to said metal portions to establish a high frequency current flow path along the edges from one contact to said weld position and then back to the other contact, said current flow over said path penetrating the edges and heating the edges to a sufficient depth and temperature so that, as the edges are urged together at said weld point, they will weld together in said seam.

3. Apparatus in accordance with claim 2 in which said last named means comprises an insulator tube, an igniter electrode mounted within said tube, a high frequency oscillatory voltage coupled to said igniter electrode, and means for flowing gas through said tube to be ionized by said igniter electrode.

4. Apparatus in accordance with claim 2 in which said electrodes are provided with a tungsten surface at the position of contact with the arc.

5. Apparatus in accordance with claim 2 in which said electrodes are water cooled.

6. Apparatus in accordance with claim 2 in which said source has a frequency of 200,000–500,000 c.p.s.

7. Apparatus in accordance with claim 2 in which an insulator plate is positioned between said electrodes and extends between said sheet edges to confine the plasma arc between edge and the respective electrodes.

8. Apparatus in accordance with claim 2 in which said edges are the edges of a sheet formed into tubular shape.

9. Apparatus in accordance with claim 2 in which an inert gas is used for the plasma arc.

10. Apparatus in accordance with claim 2 in which said oscillatory voltage is derived from a Tesla coil.

References Cited in the file of this patent
UNITED STATES PATENTS

| | | |
|---|---|---|
| 2,737,643 | Marsden | Mar. 6, 1956 |
| 2,818,489 | Kalning et al. | Dec. 31, 1957 |
| 2,876,323 | Rudd | Mar. 3, 1959 |